United States Patent
Owada et al.

(10) Patent No.: US 6,598,723 B2
(45) Date of Patent: Jul. 29, 2003

(54) CLUTCH OPERATING APPARATUS

(75) Inventors: Toshinobu Owada, Hannan (JP); Hideo Fujita, Sennan (JP); Kenichiro Tsuji, Sakai (JP)

(73) Assignee: Kubota Corporation (JP)

( * ) Notice: Subject to any disclaimer, the term of this patent is extended or adjusted under 35 U.S.C. 154(b) by 0 days.

(21) Appl. No.: 09/922,599

(22) Filed: Aug. 3, 2001

(65) Prior Publication Data

US 2002/0074205 A1 Jun. 20, 2002

(30) Foreign Application Priority Data

Dec. 15, 2000 (JP) ..................................... 2000-382821
Dec. 22, 2000 (JP) ..................................... 2000-391034

(51) Int. Cl.$^7$ ............................................. F16D 23/12
(52) U.S. Cl. ..................................... 192/85 R; 192/995
(58) Field of Search ........................... 192/85 R, 88 R, 192/99 S, 85 C, 91 R; 74/560, 512

(56) References Cited

U.S. PATENT DOCUMENTS

| | | | | |
|---|---|---|---|---|
| 3,766,342 A | * | 10/1973 | Stadelmann | ................ 200/283 |
| 4,779,713 A | * | 10/1988 | Tomala et al. | ............ 192/111 A |
| 4,793,205 A | * | 12/1988 | Guidicelli | .............. 74/501.5 R |
| 4,950,850 A | * | 8/1990 | Kamimura et al. | ...... 200/61.89 |
| 5,957,811 A | * | 9/1999 | Gustafsson | ................ 29/401.1 |

FOREIGN PATENT DOCUMENTS

JP 8-184328 A * 7/1996

* cited by examiner

*Primary Examiner*—Saul Rodriguez
(74) *Attorney, Agent, or Firm*—Webb, Ziesenhiem Logsdon Orkin & Hanson. P.C.

(57) ABSTRACT

A clutch operating apparatus having a control valve for controlling pressure oil to connect and disconnect a clutch (7), a clutch pedal (8) supported to be pivotable, a bracket pivotable with the clutch pedal (15), an interlocking mechanism (9) including an interlocking member (24, 25; 51) for operatively interconnecting the bracket and the control valve to operate the control valve with a pivotal movement of the clutch pedal, and a coupling mechanism (100) for coupling the bracket and to one end of the interlocking member. The coupling mechanism (100) includes a connecting pin disposed on one of the bracket and the interlocking member (28), and receiving bores formed in the other of the bracket and the interlocking member (29, 31) for receiving said connecting pin. The receiving bores are in form of slots shaped such that the clutch pedal has a lost motion only in an initial pivotal displacement thereof not to transmit the pivotal displacement to the control valve.

11 Claims, 8 Drawing Sheets

CLUTCH OPERATING APPARATUS

BACKGROUND OF THE INVENTION

1. Field of the Invention

This invention relates to a clutch operating apparatus having a control valve for controlling pressure oil to connect and disconnect the clutch, a clutch pedal supported to be pivotable, a bracket pivotable with the clutch pedal, and an interlocking mechanism including an interlocking member for transmitting a pivotal displacement of the clutch pedal to the control valve.

2. Description of the Related Art

In a tractor, a hydraulic clutch may be employed to connect and disconnect drive transmission from the engine to a drive transmission mechanism of a propelling system or PTO system. A clutch operating apparatus for operating the hydraulic clutch includes a clutch pedal supported to be pivotable when depressed, and a control valve with a linearly movable spool for controlling the hydraulic clutch. In order to transmit an operational displacement of the clutch pedal to the control valve, it has been considered to operatively interconnect the clutch pedal and the spool of the control valve through an interlocking mechanism having a link, rod, arm, lever and so on.

With the above clutch operating apparatus constructed to transmit an operational displacement of the clutch pedal as it is directly to the control valve, when the clutch pedal is not depressed, for example, pressure oil is supplied to the hydraulic clutch to maintain the clutch in a connected state (the state of transmitting drive from the engine to the drive transmission mechanism). By depressing the clutch pedal, the spool is pulled out and the pressure oil is drained from the hydraulic clutch to disconnect the clutch (i.e. to break the drive transmission from the engine to the drive transmission mechanism). However, in an operation requiring the clutch pedal to be depressed frequently, for example, it often is the case that the driver leaves his or her foot on a pedal portion of the clutch pedal even in situations where the clutch should be maintained in the connected state.

In such a case, the spool of the control valve could be operated by a load applied from the foot resting on the clutch pedal to the pedal portion of the clutch pedal unless a lost motion (play) is included in a range (stroke) of clutch depression. This would result in a pressure drop in the clutch pressure (i.e. clutch-connecting pressure) for the hydraulic clutch, causing the hydraulic clutch to "slip". The lost motion noted above means that, even with a depression of the clutch pedal, its displacement is not transmitted to the control valve which therefore remains out of operation.

In the above clutch operating apparatus, besides providing no lost motion (play), a position of depression where a half-clutch state is recognizable is close to a depression starting position, compared with a conventional mechanical friction disk clutch. Consequently, the driver accustomed to operating the mechanical friction disk clutch has a sense of incompatibility and an unnatural feeling with respect to clutch operability.

SUMMARY OF THE INVENTION

Having regard to the state of the art noted above, the object of this invention is to provide a clutch operating apparatus for operating a hydraulic clutch, wherein a clutch pedal has play to avoid slipping of the clutch, and a half-clutch position in the second half of a stroke of the clutch pedal, to be operable with the same feeling as for operating an ordinary mechanical clutch.

The above object is fulfilled, according to this invention, by a clutch operating apparatus comprising a control valve for controlling pressure oil to connect and disconnect a clutch, a clutch pedal supported to be pivotable, a bracket pivotable with the clutch pedal, an interlocking mechanism including an interlocking member for operatively interconnecting the bracket and the control valve to operate the control valve with a pivotal movement of the clutch pedal, and a coupling mechanism for coupling the bracket and to one end of the interlocking member. The coupling mechanism includes a connecting pin disposed on one of the bracket and the interlocking member, and receiving bores formed in the other of the bracket and the interlocking member for receiving the connecting pin. The receiving bores are in form of slots shaped such that the clutch pedal has a lost motion only in an initial pivotal displacement thereof not to transmit the pivotal displacement to the control valve.

With the above construction, the coupling mechanism in the operational displacement transmission line extending between the clutch pedal and control valve involves a lost motion (play) only during an initial operational displacement of the clutch pedal. Thus, the driver is given the same feeling of operation as in operating a conventional mechanical clutch. With this lost motion (play), a clutch pressure drop may be avoided even when the driver keeps his or her foot resting on the pedal portion of the clutch pedal in repeating a clutch-connecting operation frequently.

As noted hereinbefore, the operational displacement transmission mechanism that transmits a pivotal displacement of the clutch pedal as converted to a displacement for operating the spool of the control valve tends to entail a problem that a smooth operational displacement transmission is impaired by twisting and the like. To avoid this problem, in one preferred embodiment of this invention, the interlocking mechanism is coupled to a spool of the control valve for transmitting an operational displacement thereto through a lever pivotable about a first axis, and the interlocking mechanism includes a relay mechanism pivotable about a second axis parallel to the first axis to transmit the operational displacement. In another embodiment, a guide member is provided for guiding the interlocking member so as to receive a sideways force applied to the interlocking member in time of transmitting an operational displacement. In a further embodiment, the interlocking member has a spring for acting to oppose a sideways force applied to the interlocking member in time of transmitting an operational displacement.

In any case, such a structural feature of the operational displacement transmission line assures a smooth operation of the spool of the control valve for connecting and disconnecting the clutch even where the spool is operated by a pivotal movement of a lever pivotable about an axis not parallel to the pivotal axis of the clutch pedal. Thus, the spool is never stalled or stuck when the clutch pedal is depressed.

Other features and advantages of this invention will be apparent from the following description of the embodiment to be taken with reference to the drawings.

DESCRIPTION OF THE PREFERRED EMBODIMENTS

Figure 1:
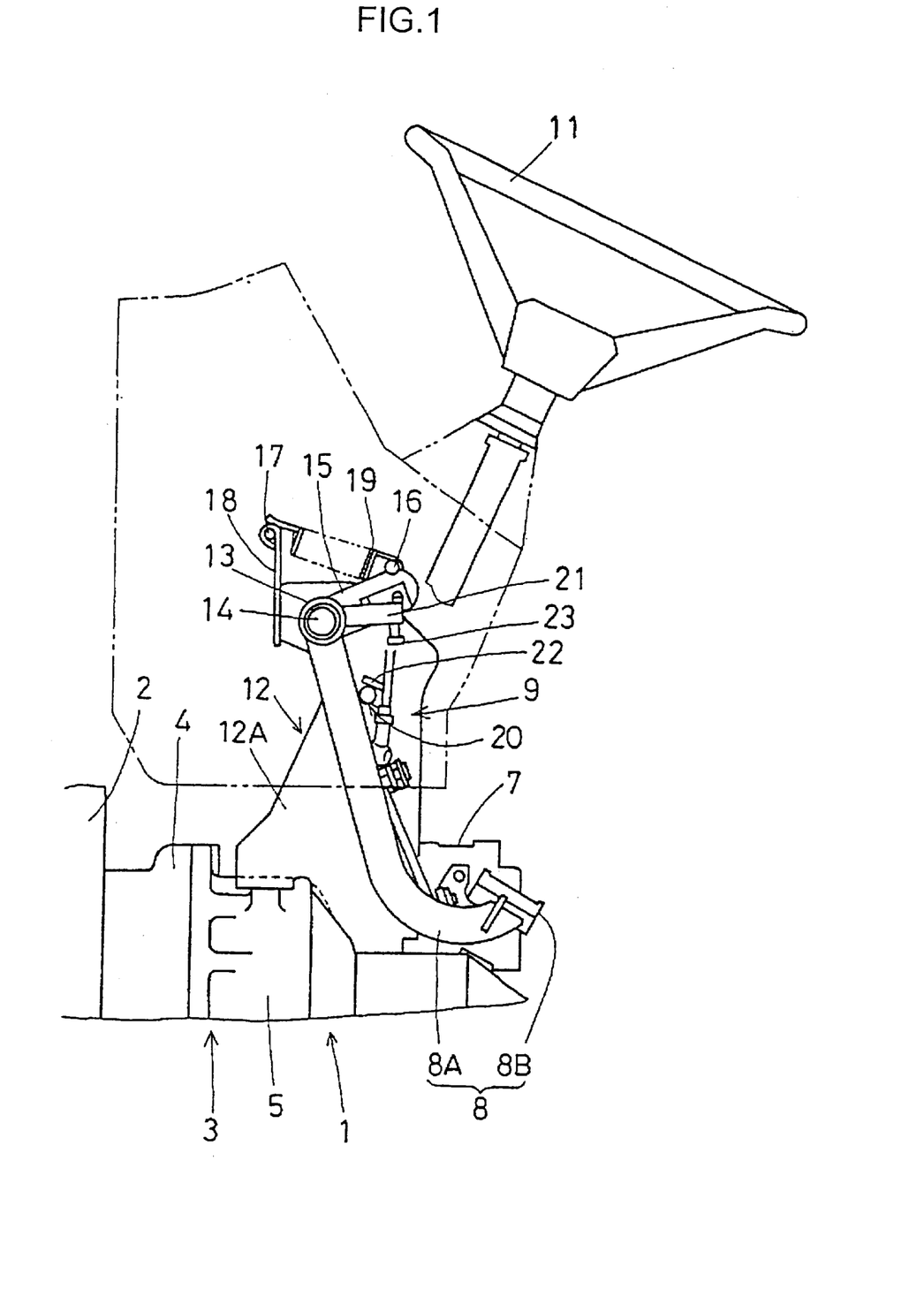
FIG. 1 is a side view of a portion of a tractor body including a steering column having a clutch operating apparatus according to this invention.

FIG. 1 shows a region of a tractor body 1 around a steering column. A transmission case 3 is connected to the rear of an engine 2. The transmission case 3 houses a drive transmission mechanism of a propelling system and a PTO system, and acts as a main component of tractor body 1. Drive from the engine 2 is transmitted to the drive transmission mechanism to drive propelling wheels and a working implement attached to the tractor.

The transmission case 3 is formed, for example, of a flywheel housing 4 connected to the rear surface of a crankcase of engine 2, a clutch housing 5 connected to the rear surface of flywheel housing 4, and a gearbox, not shown, connected to the rear surface of clutch housing 5.

The clutch housing 5 has, mounted in a front portion thereof, a main clutch for transmitting or cutting off the drive from an output shaft of engine 2 to an input shaft of the drive transmission mechanism. Though not shown, the main clutch is a hydraulic clutch known per se that is connectable and disconnectable by hydraulic pressure.

Figure 2:
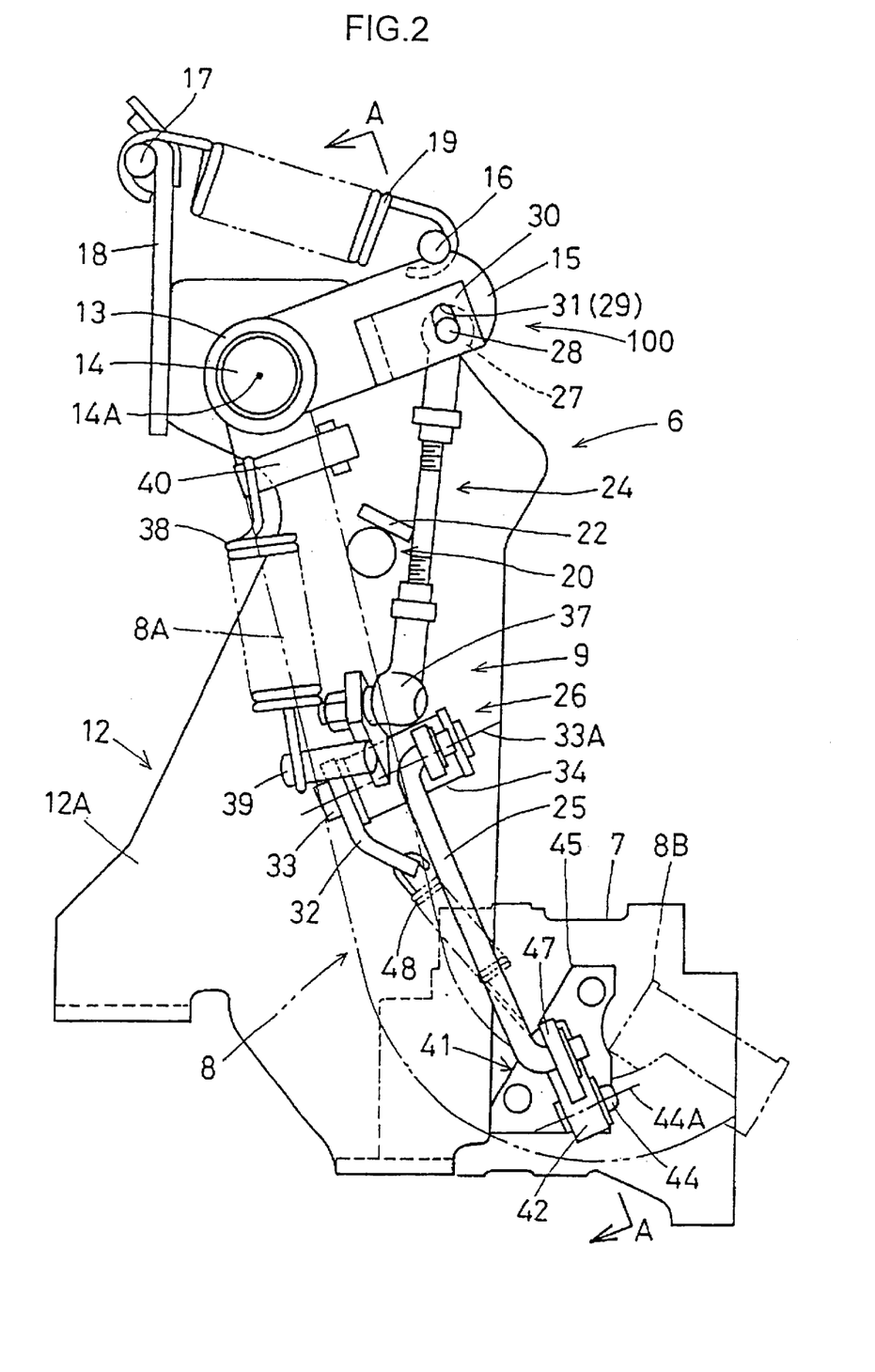
FIG. 2 is a side view of the clutch operating apparatus.

The hydraulic clutch is operable by a clutch operating apparatus 6 as shown in FIG. 2. The operating apparatus 6 includes a control valve 7 for controlling pressure oil to connect and disconnect the hydraulic clutch, a clutch pedal 8 for operating the control valve 7, and an interlocking mechanism 9 for operatively connecting the clutch pedal 8 to the control valve 7.

With this clutch operating apparatus 6, when the clutch pedal 8 is not depressed, for example, pressure oil from a hydraulic pump (not shown) disposed adjacent the engine 2 is supplied to the hydraulic clutch through the control valve 7 to connect the clutch (i.e. to produce a drive transmitting state). When the clutch pedal 8 is depressed, pressure oil is drained from the hydraulic clutch through the control valve 7 to disconnect the clutch (i.e. to cut off the drive).

Figure 3:
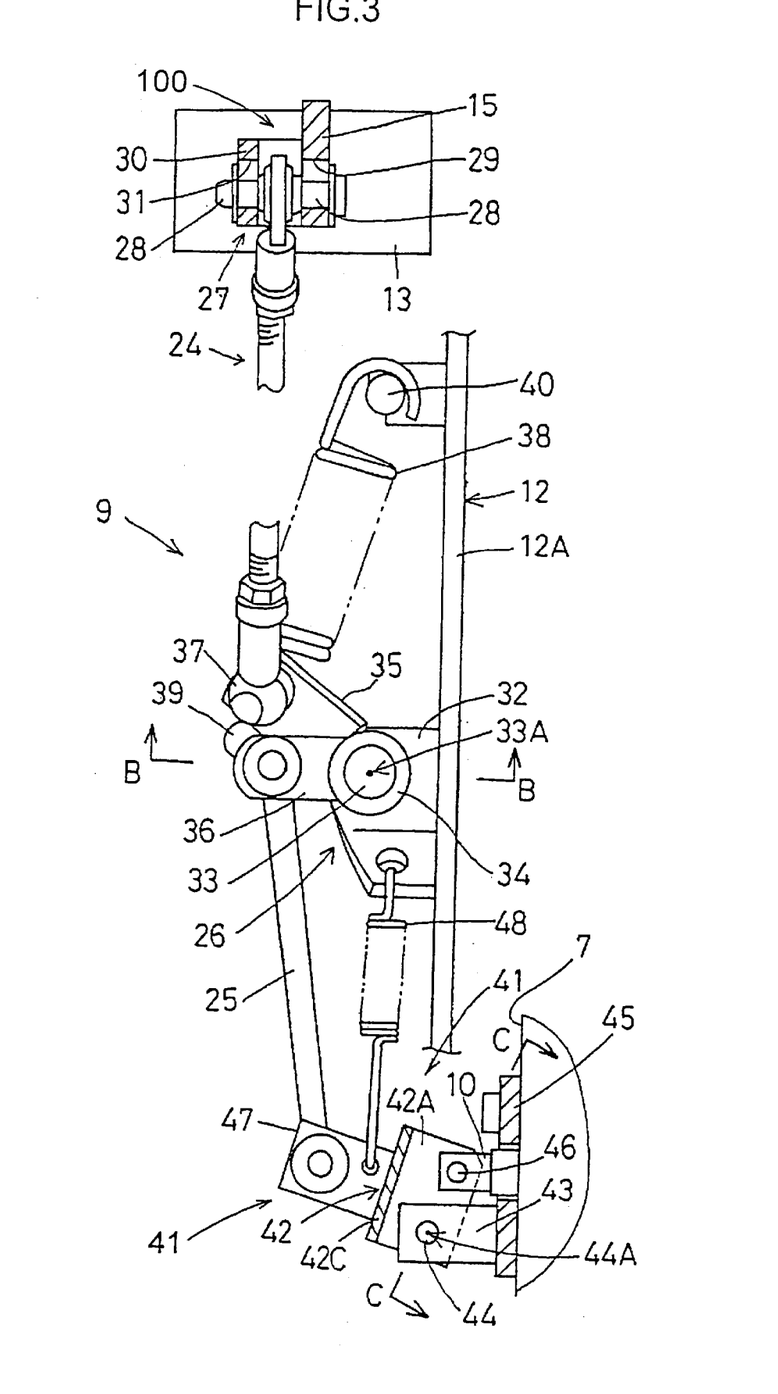
FIG. 3 is a section taken on line A—A of FIG. 2.

The control valve 7 is in the form of a selector valve with a linearly movable spool 10. The control valve 7 is disposed on an upper forward surface of clutch housing 5 and below a steering wheel 11 (FIG. 1), with the spool 10 projecting laterally (leftward) as shown in FIG. 3.

A driver's seat is disposed rearwardly of the steering wheel 11. Steps are arranged at opposite, right and left sides of the clutch housing 5.

A support frame 12 is erected on the upper forward surface of clutch housing 5 to form part of the steering column. The support frame 12 has a pair of right and left side walls 12A appropriately interconnected at front and lower ends thereof.

The clutch pedal 8 employed in this embodiment is the suspension type, and is disposed laterally of the support frame 12, and more particularly at the side where the spool 10 of control valve 7 is located.

This clutch pedal 8 includes an arm portion 8A having an upper end thereof supported by a side wall 12A of support frame 12 to be pivotable fore and aft about a transverse axis 14A, and a pedal portion 8B disposed at the lower end of arm portion 8A.

The arm portion 8A has a tubular boss 13 disposed at the upper end thereof. The boss 13 is rotatably mounted on a pedal pivot shaft 14 having the axis 14A and projecting laterally outwardly from the support frame 12. As a result, the arm portion 8A is pivotable longitudinally of the tractor body 1.

The boss 13 has a bracket 15 projecting radially outwardly and rearwardly therefrom to be pivotable with the clutch pedal 8.

A return spring 19 consisting of a tension coil spring is disposed above the boss 13. The return spring 19 has one end thereof hooked on a spring catch 16 disposed in an upper position on the bracket 15, and the other end hooked on a spring catch 17 formed on a plate 18 fixed to the support frame 12. The clutch pedal 8 is biased counterclockwise in FIG. 1 by the force of this return spring 19.

A stopper 20 is disposed on the left side wall 12A of support frame 12 to project laterally outwardly therefrom. The arm portion 8A is movable into contact with the stopper 20 to limit a rearward pivotal movement of the clutch pedal 8 under the force of return spring 19. Thus, the clutch pedal 8 is positioned in a posture shown in solid lines in FIG. 1 and phantom lines in FIG. 2, thereby placing the clutch in a connected state.

As seen from FIG. 1, the boss 13 has another bracket 21 projecting radially outwardly and rearwardly therefrom. The bracket 21 has a contact element 23 attached to a distal end thereof for contacting a contact plate 22 of the stopper 20 when the clutch pedal 8 pivots forward against the force of return spring 19.

Thus, the clutch pedal 8 is depressible from the posture (for connecting the clutch) in solid lines in FIG. 1 and phantom lines in FIG. 2 until the contact element 23 contacts the contact plate 22. The hydraulic clutch is disconnected in the course of pivotal displacement (stroke) to a maximum value of the clutch pedal 8.

The contact element 23 is positionally variable to adjust a maximum amount of pivotal displacement (stroke) of clutch pedal 8.

As shown in FIGS. 1 through 3, the interlocking mechanism 9 includes a first interlocking member 24 in the form of a rod having an upper end thereof operatively connected to the bracket 15 through a first coupling mechanism 100, a second interlocking member 25 in the form of a rod having a lower end thereof operatively connected to the spool 10 of control valve 7 through a second coupling mechanism 41, and a relay mechanism 26 operatively interconnecting the first interlocking member 24 and second interlocking member 25.

The first interlocking member 24 has an adjustable length, and has a transverse connecting pin 28 attached to the upper end thereof through a ball joint 27. The connecting pin 28 has one end thereof inserted into a receiving bore 29 formed in the bracket 15, and the other end inserted into a receiving bore 31 formed in a mounting plate 30 transversely opposed to the bracket 15. That is, the connecting pin 28 and receiving bores 29 and 31 constitute the first coupling mechanism 100. The receiving bores 29 and 31 are in the form of arcuate slots about the axis of pedal pivot shaft 14 (or vertically elongate slots).

Figure 4:
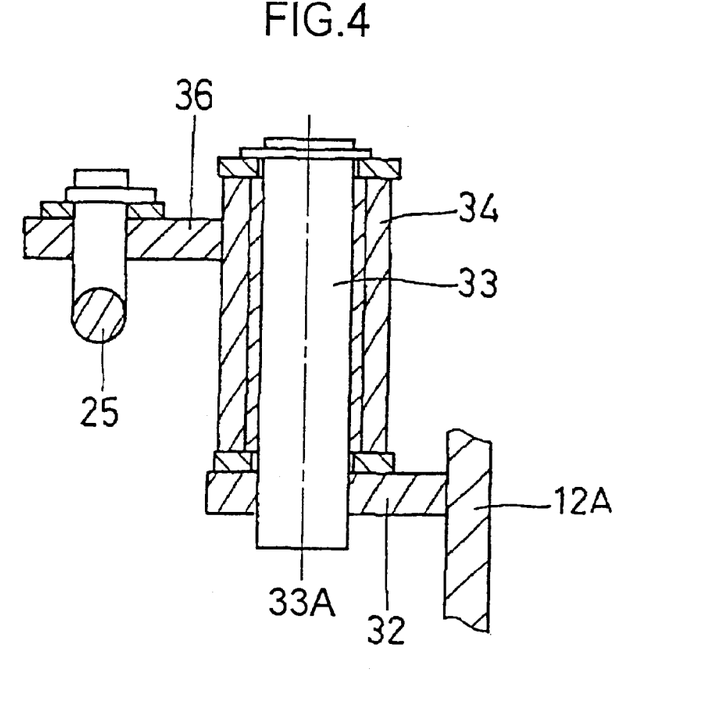
FIG. 4 is a section taken on line B—B of FIG. 3.

As shown in FIGS. 2, 3 and 4, the relay mechanism 26 has a support shaft 33 fixed to a bracket 32 fixed to the left side wall 12A of support frame 12. The support shaft 33 has an inclined axis 33A (second axis) extending forward and downward.

The support shaft 33 has a tubular shaft 34 rotatably mounted thereon through a bushing. The tubular shaft 34 has a first arm 35 and a second arm 36 projecting radially therefrom.

The lower end of the first interlocking member 24 is coupled to the first arm 35 through a ball joint 37. The first arm 35 has a spring catch 39 for engaging one end of a return spring 38 in the form of a tension coil spring.

The other end of return spring 38 is hooked on a catch 40 disposed on the left side wall 12A of support frame 12. The force of this return spring 38 biases the tubular shaft 34 to rotate clockwise about the axis 33A in FIG. 3.

The upper end of second interlocking member 25 is coupled to the second arm 36 to be pivotable about an axis extending parallel to the axis 33A of support shaft 33.

The lower end of the second interlocking member 25 is operatively coupled to the spool 10 of control valve 7 through the second coupling mechanism 41.

The second coupling mechanism 41 has a channel-shaped lever 42 with front and rear walls 42A and 42B interconnected through a side wall 42C.

This lever 42 is supported by a bracket 43 attached to the control valve 7, through a support shaft 44 having an axis 44A (first axis) parallel to the axis 33A (second axis) of support shaft 33. Thus, the lever 42 is pivotable about the axis 44A.

Figure 5:
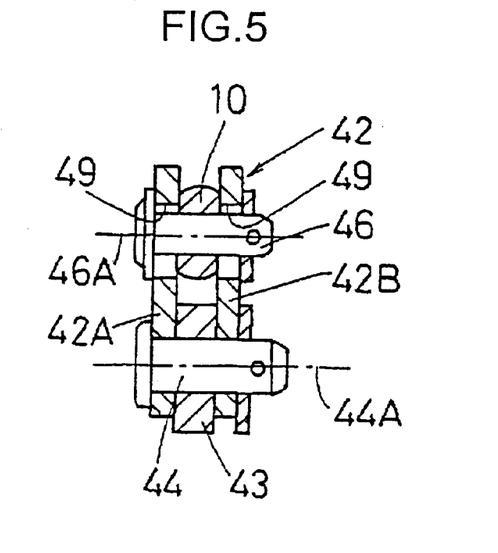
FIG. 5 is a section taken on line C—C of FIG. 3.

The bracket 43 is fixed to and projects laterally from a stay 45 fixed to the control valve 7. As shown in FIG. 5, the bracket 43 has a distal end portion thereof inserted between lower portions of the front and rear walls 42A and 42B of lever 42 and connected to the lever 42 through the support shaft 44.

The spool 10 of control valve 7 is inserted between upper portions of the front and rear walls 42A and 42B of lever 42, and pivotally connected to the lever 42 through a support shaft 46 having an axis 46A extending parallel to the axes 33A and 44A of support shafts 33 and 44. With pivotal movement of the lever 42 about the support shaft 44, the spool is pushed and pulled to slide transversely.

The front and rear walls 42A and 42B of lever 42 define receiving bores 49 in the form of slots for receiving the support shaft 46. These bores 49 allow the spool 10 to move linearly with a pivotal movement of lever 42.

The lever 42 has an engaging piece 47 projecting laterally therefrom. The lower end of the second interlocking member 25 is connected to the engaging piece 47 to be pivotable about an axis parallel to the axis 44A of support shaft 44.

One end of a spring member 48 in the form of a tension coil spring is attached to the engaging piece 47. The other end of spring member 48 is connected to the bracket 32 of relay mechanism 26. The force of this spring member 48 absorbs play between the second arm 36 and engaging piece 47 and the second interlocking member 25, and between the lever 42 and the bracket 43 and spool 10.

With the clutch operating apparatus 6 having the above construction, when the clutch pedal 8 is not depressed, the arm portion 8A of clutch pedal 8 is in contact with the stopper 20 not to be pivotable rearward.

The connecting pin 28 at the upper end of the first interlocking member 24 lies in the lower ends of receiving bores 29 and 31. The spool 10 of control valve 7 is pushed inward to supply pressure oil to the hydraulic clutch.

When, in this state, the clutch pedal 8 is depressed, the bracket 15 pivots downward. However, while the connecting pin 28 moves from one end to the other end of the elongate receiving bores 29 and 31, the displacement of clutch pedal 8 is not transmitted to the spool 10 through the interlocking mechanism 9. During this period, the pivotal movement of clutch pedal 8 does not operate the control valve 7. Thus, the clutch pedal 8 has a "lost motion (play)" included in the stroke of clutch pedal 8, which corresponds to the range of movement of connecting pin 28 from one end to the other end of receiving bores 29 and 31.

With this "lost motion (play)" provided, even when the hydraulic clutch is in the connected state and the driver leaves his or her foot on the pedal portion 8B of clutch pedal 8, the pressure of the hydraulic clutch never lowers to cause a clutch slipping.

The force of return spring 19 is set appropriately to withstand the load of the foot resting on the pedal portion 8B of clutch pedal 8.

With this "lost motion (play)" provided, a half-clutch position is shifted to the second half of the stroke of clutch pedal 8. Thus, the clutch operating apparatus may be operated with the same feeling as when operating a conventional mechanical clutch operating apparatus, thereby assuring excellent operability.

When the clutch pedal 8 is further depressed beyond the range of "lost motion (play)", the bracket 15 pushes the first interlocking member 24 downward to rotate the tubular shaft 34 about the axis 33A. Then, the second interlocking member 25 is pushed downward to swing the lever 42 downward about the axis 44A of support shaft 44, thereby to pull out the spool 10.

At this time, the lever 42 for axially pushing and pulling the spool 10 pivots about the axis 44A parallel to the axis 33A of tubular shaft 34. The bracket 15 fixed to the boss 13 of clutch pedal 8 pivots downward about the transverse axis (axis of pedal shaft 14). Thus, the lever 42 is not subjected to a force acting in a direction to turn the lever 42 forward. The spool 10 is allowed to slide smoothly in the axial direction without being twisted.

When the spool 10 is pulled out, pressure oil is drained from the hydraulic clutch through the control valve 7. The clutch is disconnected by the time the clutch pedal 8 reaches its stroke end.

When the clutch pedal 8 is released from the declutching position, the first and second interlocking members 24 and 25, interlocking mechanism 9 and clutch pedal 8 are returned to the respective original positions by the forces of return springs 19 and 38. The spool 10 is pushed in, and the clutch is connected by the time the clutch pedal 8 reaches the range of "lost motion (play)".

[Other Embodiments]

Figure 6:
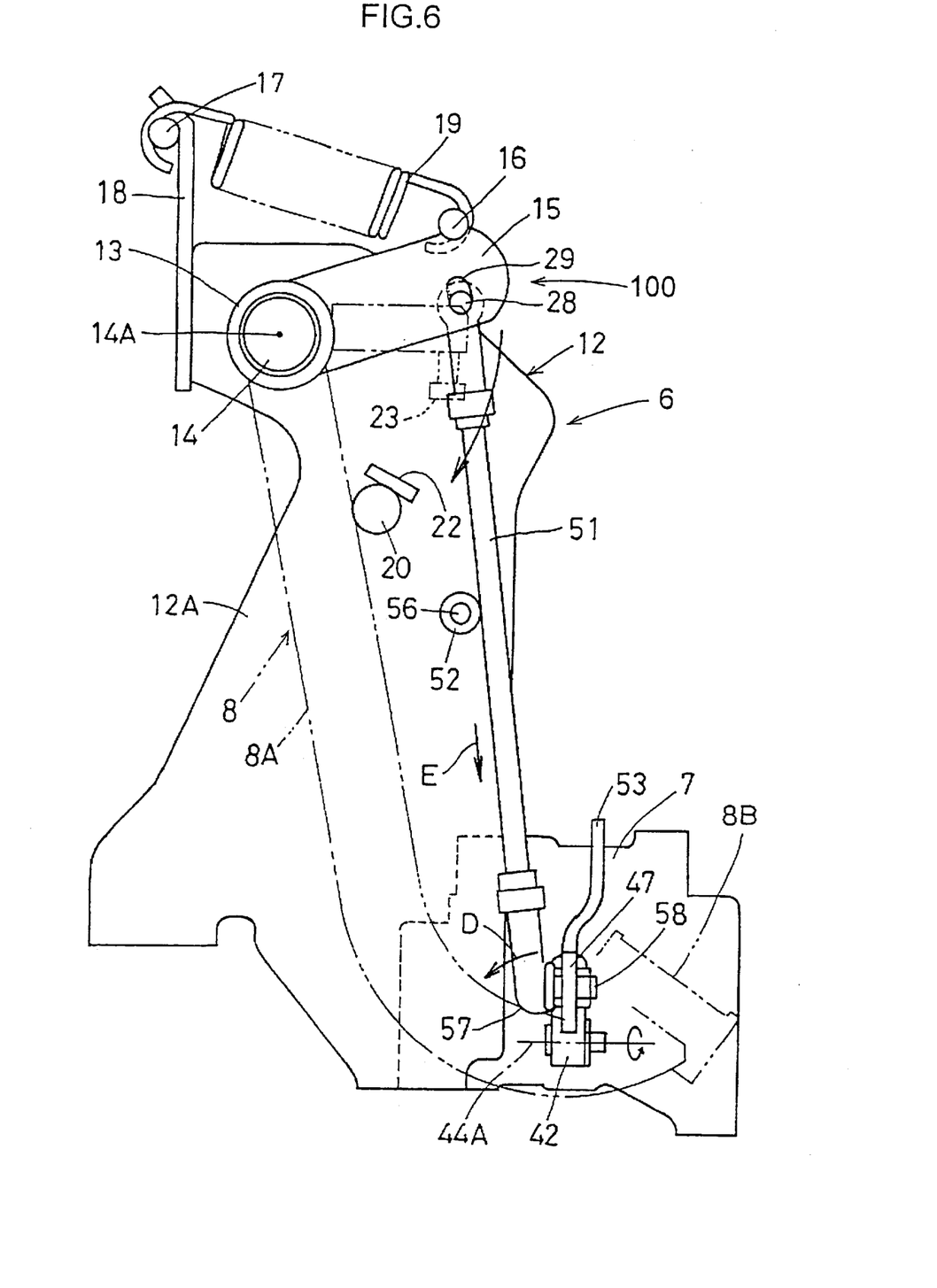
FIG. 6 is a side view of a clutch operating apparatus in another embodiment.
Figure 7:
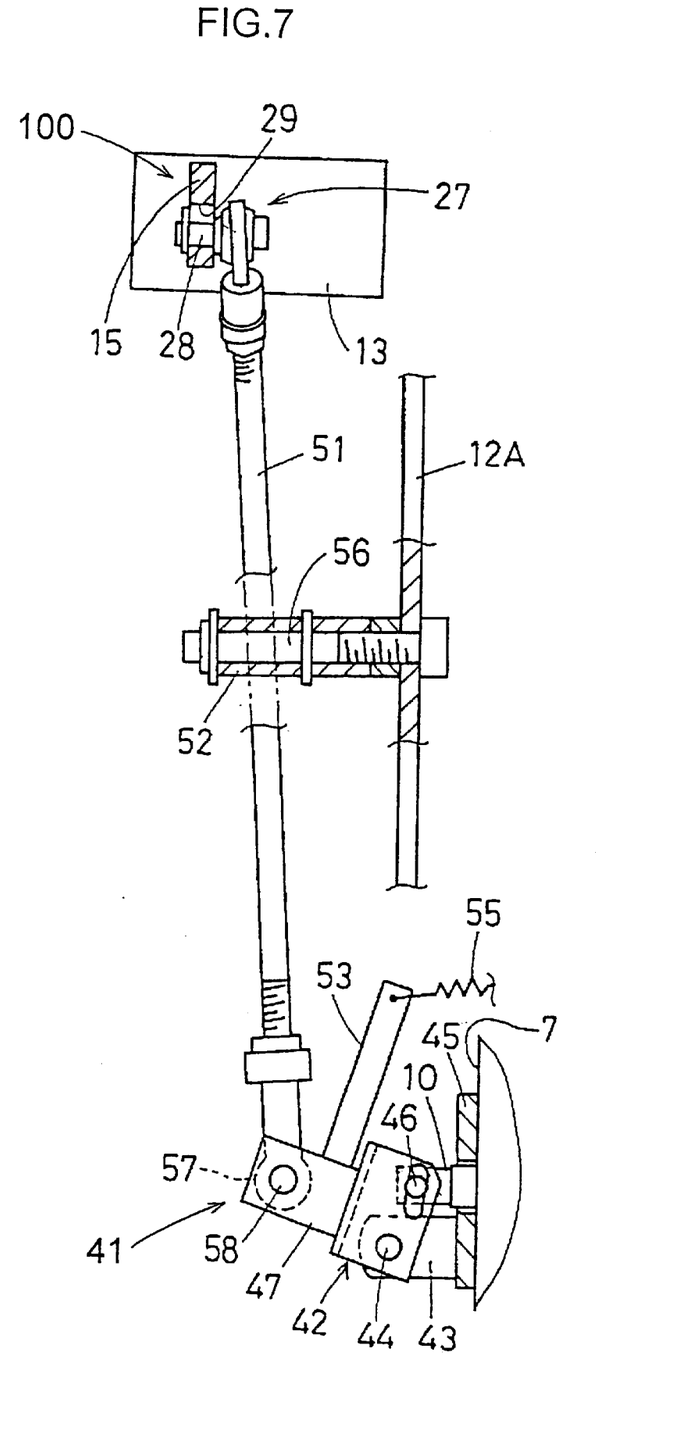
FIG. 7 is a rear view of the clutch operating apparatus shown in FIG. 6.

FIGS. 6 and 7 show a clutch operating apparatus 6 in another embodiment. This embodiment differs from the foregoing embodiment in that the engaging piece 47 fixed to the lever 42 and the bracket 15 fixed to the boss 13 of clutch pedal 8 are directly and operatively interconnected through an interlocking member 51 in the form of a rod or the like, without using the relay mechanism 26 (hence the relay mechanism 26 is not provided), that a support roller 52 is provided for contacting a front position of interlocking member 51 and guiding the interlocking member 51 substantially in the axial direction (substantially in the vertical direction indicated by an arrow E in FIG. 6) to prevent the lever 42 from turning in the direction of arrow D, and that a return spring 55 in the form of a tension coil spring is provided to extend between a spring catch 53 fixedly projecting upward from the engaging piece 47 and a spring catch disposed on a main body of control valve 7.

The other aspects of construction are substantially the same as in the foregoing embodiment.

The support roller 52 is rotatably mounted on a support shaft 56 projecting laterally from the left side wall 12A of support frame 12.

The interlocking member 51 has a pin 58 attached to a lower end thereof through a ball joint 57. The pin 58 is pivotally attached to the engaging piece 47.

In this embodiment, the interlocking member 51 is guided by the support roller 52, so that the interlocking member 51 applies no force to turn the lever 42 in the direction of arrow D. Consequently, the spool 10 is axially slidable smoothly without being twisted.

Figure 8:
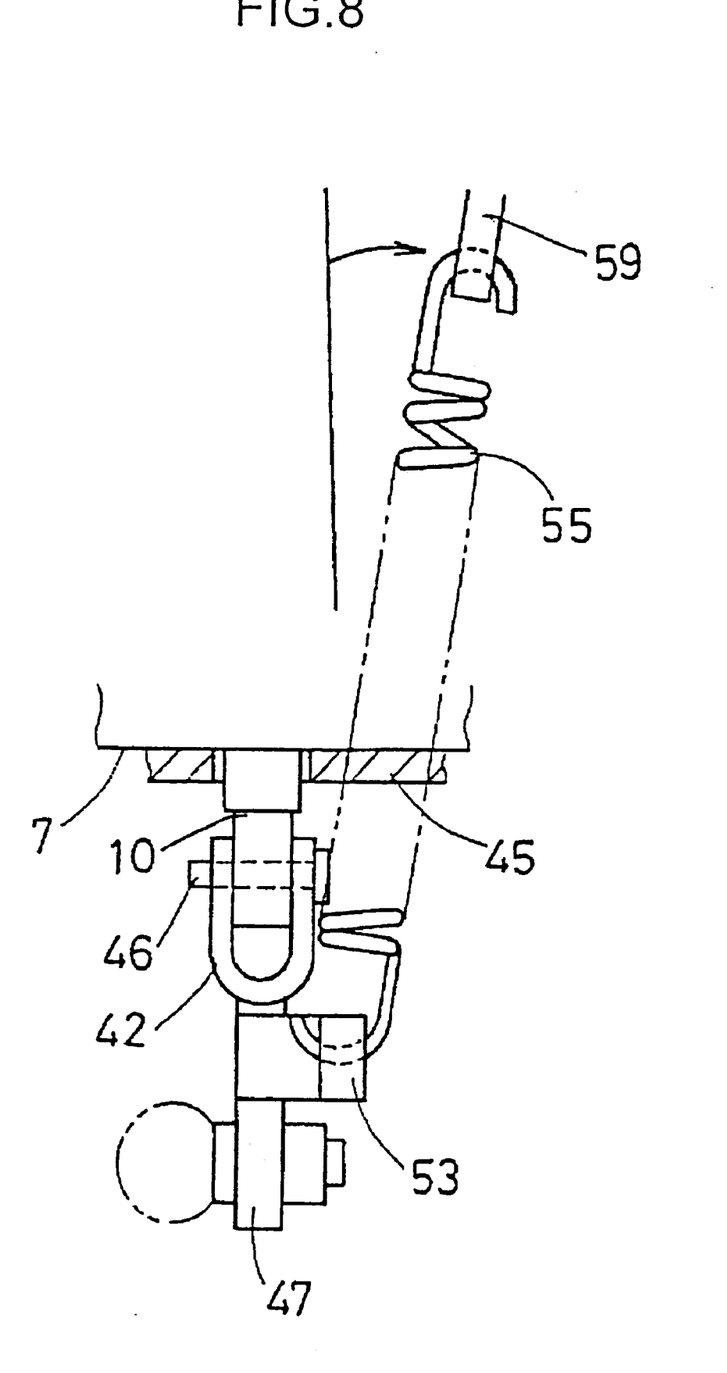
FIG. 8 is a plan view of an operative connection of an interlocking mechanism to a control valve in a further embodiment.

FIG. 8 shows a further embodiment. The clutch operating apparatus 6 shown in FIGS. 6 and 7 is modified here such that the position of return spring 55 engaging a spring catch 59 on the main body of control valve 7 is shifted rearward, whereby the force of return spring 55 is applied to the lever 42 in a direction (turn preventing direction) opposite to the direction of turning the lever 42. This apparatus is substantially the same as the clutch operating apparatus 6 shown in FIGS. 6 and 7, except that the support roller 52 and support shaft 56 are omitted.

Figure 9:
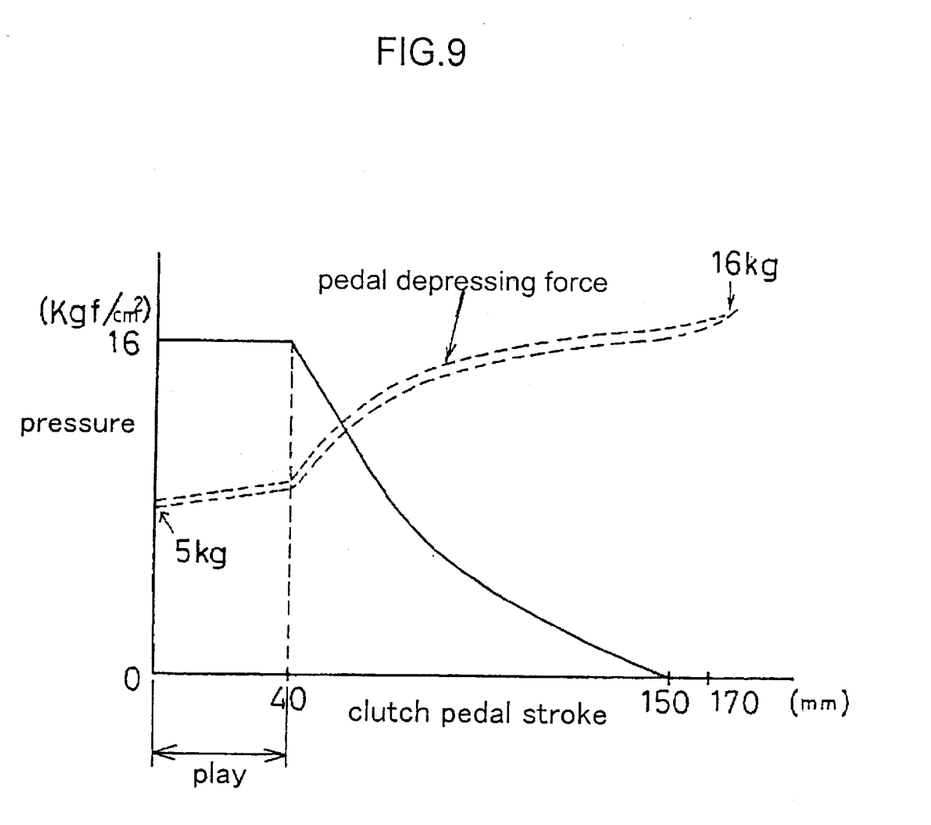
FIG. 9 is a graph showing a relationship between clutch pedal stroke and clutch pressure.

In the example shown in FIG. 9, a maximum clutch pressure is set to 16 Kgf/cm$^2$, and the stroke of clutch pedal 8 to 170 mm, with a "lost motion (play)" having a range of 40 mm. The clutch pressure becomes zero when the clutch pedal 8 pivots 150 mm from the clutch connecting position. The clutch pressure for the half-clutch position is set within a range of 1.5 to 6 Kgf/cm$^2$.

The hydraulic clutch may be connected by the biasing force of a spring, and disconnected by hydraulic pressure. Further, the clutch may be a wet type multidisk clutch with a plurality of clutch disks pressed by a piston into contact with one another, or a hydraulic clutch with a release hub movable by a hydraulic actuator to press a diaphragm spring to connect the cutch. This invention is applicable to a clutch operating apparatus for operating a clutch connectable or disconnectable by hydraulic pressure.

What is claimed is:

1. A clutch operating apparatus comprising:
    a control valve for controlling pressure oil to connect and disconnect a clutch;
    a clutch pedal supported to be pivotable from a home position thereof;
    a bracket pivotable with said clutch pedal;
    an interlocking mechanism including an interlocking member for operatively interconnecting said bracket and said control valve to operate said control valve with a pivotal movement of said clutch pedal;
    a coupling mechanism for coupling said bracket to one end of said interlocking member, said coupling mechanism having a lost motion mechanism which includes a connecting pin disposed on one of said bracket and said interlocking member, and receiving bores defined in the other of said bracket and said interlocking member in the form of slots for receiving said connecting pin, wherein said lost motion mechanism does not allow said clutch pedal to transmit its pivotal displacement to said control valve during an initial pivotal displacement of said clutch pedal, and allows said clutch pedal to transmit the pivotal displacement to said control valve in response to completion of said initial pivotal displacement;
    a first spring operatively connected to said clutch pedal for applying a resisting force to said clutch pedal toward said home position in response to said initial pivotal displacement; and
    a second spring operatively connected to said interlocking member for applying a second resisting force to said clutch pedal toward said home position in response to completion of said initial pivotal displacement.

2. A clutch operating apparatus according to claim 1, wherein said initial pivotal displacement corresponds to about ¼ of an entire stroke of said clutch pedal.

3. A clutch operating apparatus according to claim 1, wherein:
    said interlocking mechanism is coupled to a spool of said control valve for transmitting an operational displacement thereto through a lever pivotable about a first axis, and
    said interlocking mechanism includes a relay mechanism pivotable about a second axis parallel to said first axis to transmit the operational displacement.

4. A clutch operating apparatus according to claim 1, wherein each of said receiving bores is elongated having opposed first and second ends, and said connecting pin is movable between said first and second ends during said initial pivotal displacement of said clutch pedal, and placed into contact with said second end to press said second end in response to completion of said initial pivotal displacement.

5. A clutch operating apparatus comprising:
    a control valve for controlling pressure oil to connect and disconnect a clutch;
    a clutch pedal supported to be pivotable;
    a bracket pivotable with said clutch pedal;
    an interlocking mechanism including an interlocking member for operatively interconnecting said bracket and said control valve to operate said control valve with a pivotal movement of said clutch pedal; and
    a coupling mechanism for coupling said bracket to one end of said interlocking member, said coupling mechanism including:
        a connecting pin disposed on one of said bracket and said interlocking member; and
        receiving bores formed in the other of said bracket and said interlocking member for receiving said connecting pin, said receiving bores being in the form of slots shaped such that said clutch pedal has a lost motion only in an initial pivotal displacement thereof not to transmit the pivotal displacement to said control valve,
    wherein said interlocking member has a spring for acting to oppose a sideways force applied to said interlocking member in time of transmitting an operational displacement.

6. A clutch operating apparatus according to claim 5, wherein said initial pivotal displacement corresponds to about ¼ of an entire stroke of said clutch pedal.

7. A clutch operating apparatus comprising:
    a control valve for controlling pressure oil to connect and disconnect a clutch;
    a clutch pedal supported to be pivotable;

a bracket pivotable with said clutch pedal;

an interlocking mechanism including an interlocking member for operatively interconnecting said bracket and said control valve to operate said control valve with a pivotal movement of said clutch pedal; and a coupling mechanism for coupling said bracket to one end of said interlocking member, said coupling mechanism including:

a connecting pin disposed on one of said bracket and said interlocking member; and receiving bores formed in the other of said bracket and said interlocking member for receiving said connecting pin, said receiving bores being in the form of slots shaped such that said clutch pedal has a lost motion only in an initial pivotal displacement thereof not to transmit the pivotal displacement to said control valve, wherein said initial pivotal displacement corresponds to about ¼ of an entire stroke of said clutch pedal.

8. A clutch operating apparatus according to claim 7, wherein:

said interlocking mechanism is coupled to a spool of said control valve for transmitting an operational displacement thereto through a lever pivotable about a first axis, and said interlocking mechanism includes a relay mechanism pivotable about a second axis parallel to said first axis to transmit the operational displacement.

9. A clutch operating apparatus comprising:

a control valve for controlling pressure oil to connect and disconnect a clutch;

a clutch pedal supported to be pivotable;

a bracket pivotable with said clutch pedal;

an interlocking mechanism including an interlocking member for operatively interconnecting said bracket and said control valve to operate said control valve with a pivotal movement of said clutch pedal; and a coupling mechanism for coupling said bracket to one end of said interlocking member, said coupling mechanism including:

a connecting pin disposed on one of said bracket and said interlocking member; and receiving bores formed in the other of said bracket and said interlocking member for receiving said connecting pin, said receiving bores being in the form of slots shaped such that said clutch pedal has a lost motion only in an initial pivotal displacement thereof not to transmit the pivotal displacement to said control valve, wherein said interlocking mechanism is coupled to a spool of said control valve for transmitting an operational displacement thereto through a lever pivotable about a first axis, and said interlocking mechanism includes a relay mechanism pivotable about a second axis parallel to said first axis to transmit the operational displacement.

10. A clutch operating apparatus comprising:

a control valve for controlling pressure oil to connect and disconnect a clutch;

a clutch pedal supported to be pivotable;

a bracket pivotable with said clutch pedal;

an interlocking mechanism including an interlocking member for operatively interconnecting said bracket and said control valve to operate said control valve with a pivotal movement of said clutch pedal;

a coupling mechanism for coupling said bracket to one end of said interlocking member, said coupling mechanism including:

a connecting pin disposed on one of said bracket and said interlocking member; and receiving bores formed in the other of said bracket and said interlocking member for receiving said connecting pin, said receiving bores being in the form of slots shaped such that said clutch pedal has a lost motion only in an initial pivotal displacement thereof not to transmit the pivotal displacement to said control valve; and a guide member for guiding said interlocking member so as to receive a sideways force applied to said interlocking member in time of transmitting an operational displacement.

11. A clutch operating apparatus according to claim 10, wherein said initial pivotal displacement corresponds to about ¼ of an entire stroke of said clutch pedal.

* * * * *